May 29, 1956  T. M. McGREGOR  2,747,314
DECOY
Filed Nov. 12, 1952

Thurman M. McGregor
INVENTOR.

BY *Ranseler O. Wyatt*

ATTORNEY

United States Patent Office 2,747,314
Patented May 29, 1956

2,747,314
DECOY

Thurman M. McGregor, Houston, Tex.

Application November 12, 1952, Serial No. 319,919

1 Claim. (Cl. 43—3)

This invention relates to new and useful improvements in a decoy.

It is an object of this invention to provide a decoy for use by duck hunters, and the like, that will attract game by moving parts and by imparting sound similar to a feeding fowl.

It is another object of the invention to provide a decoy athat will present a very lifelike appearance in the water and that will mechanically mimic the call and movements of wild fowl on the water.

With the above and other objects in view, the invention has more particular relation to certain novel features of construction and operation defined in the following specifications and illustrated in the accompanying drawings, wherein.

Figure 1:
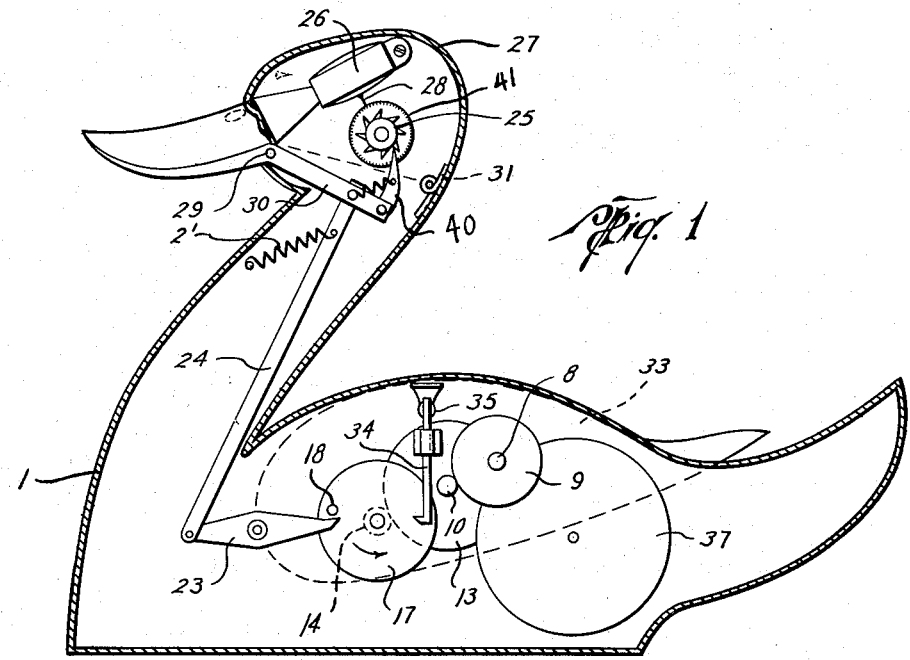
Figure 1 is an elevational view of the decoy operating mechanism, showing the decoy in dotted lines.
Figure 2:
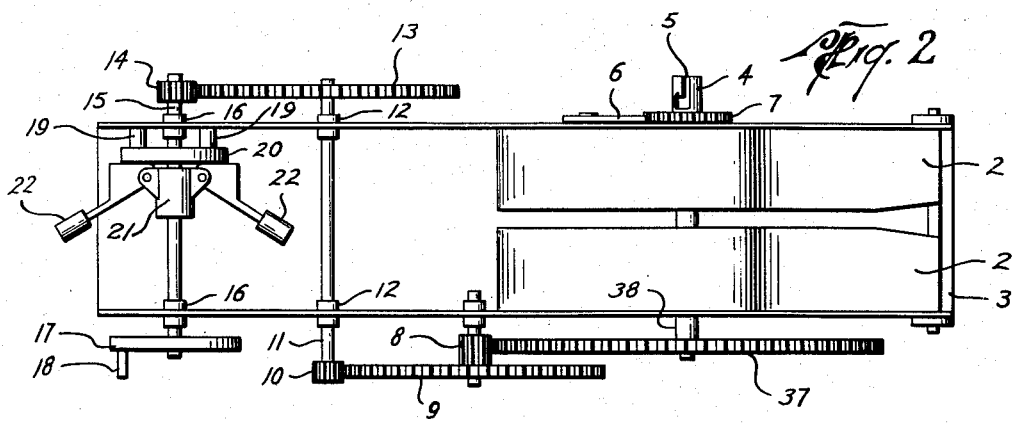
Figure 2 is a top plan view of the decoy operating device.
Figure 3:
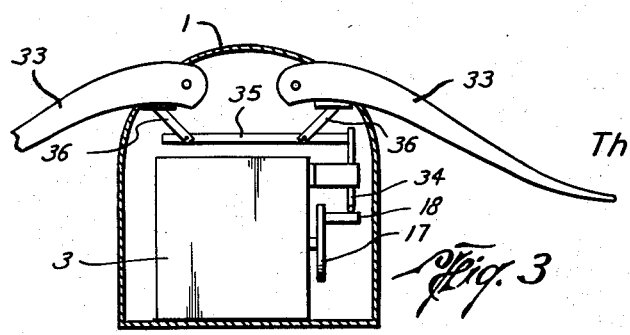
Figure 3 is an end elevational view of the wing moving mechanism, showing the wings and decoy in dotted lines.

Referring now more particularly to the drawings, the numeral 1 designates a decoy, such as a swimming duck, of any suitable bouyant material, within which the operating mechanism is housed. A pair of strong springs 2, 2, such as are used in eight-day clocks, are secured within a framework as 3. A shaft 4, to which one end of each of the springs 2 is secured, is provided with a slot 5 in which a suitable winding key may be inserted to wind the springs 2, 2. A dog 6, mounted on the framework 3, is in operative contact with the ratchet 7 mounted on the shaft 4 and which prevents the backward movement of the shaft 4 when in locked position. In operative connection with the shaft 4 is the gear shaft 38 on which a gear wheel 37 is mounted. The gear wheel 37 meshes with the pinion gear 8, which rotates the gear wheel 9, which is in mesh with the pinion gear 10 and imparts rotation thereto. The gear 10 rotates the shaft 11, which is mounted on the framework 3 through suitable bearings as 12, 12, and which rotates the gear wheel 13, which in turn rotates the pinion gear 14, which rotates the shaft 15 mounted on the framework 3 through suitable bearings as 16, 16. On the opposite end of the shaft 15 is a control wheel 17 on which is mounted the outwardly projecting stud 18. Inside of the framework 3 is a brake wheel 20, which is anchored to the framework 3 by means of the studs 19, 19 and through the axis of which the shaft 15 extends and freely rotates. Mounted on the shaft 15 is a governor 21 having the pivotally suspended pendulums 22, 22 having their pivoted ends enlarged and adapted to move into contact with the brake wheel 20 as the speed of the shaft increases, moving the pendulums outwardly, and the enlarged ends thereof into contact with the wheel 20 until the speed of the shaft 15 is reduced.

Pivoted inside of the housing 1 is a rocking arm 23, one end of which is adapted to be contacted and moved by the stud 18 on the wheel 17. Pivotally attached to the other end of the arm 23 is connecting arm 24, which extends upwardly through the neck of the housing 1. The lower beak of the decoy is hinged as at 29 and has an extended arm 30 to which the free end of the connecting arm 24 is pivotally connnected. The sound box, or squawker 26 is mounted in the upper portion 27 of the head of the decoy. The upper portion 27 of the head of the decoy may be hinged as at 31 to facilitate repairs or adjustment to the squawker 26. A spring loaded dog 40 is pivotally mounted on the extended end of the beak arm 30 and engages the teeth of the ratchet wheel 25. The wheel 25 turns a knurled wheel 41 and a needle 28 extends downwardly from the sound box 26, contacting said knurled wheel 41. A spring 21, secured to the housing 1 and to the connecting arm 24, urges the arm 24 constantly in one position.

A pair of wings as 33, 33 are pivotally mounted on the housing 1 and an actuating bar 34 is movably mounted in the housing 1 adjacent the wheel 17. A cross bar 35, in operative connection with the actuating bar 34, extends transversely across the housing 1 and has a pair of pivotally mounted actuating arms 36, 36, extending from said bar 35 to the respective wings 33, 33.

When the decoy is to be placed in operation, the user winds the springs through the shaft 4, and places the decoy in the water, the dog 6 is disengaged from the ratchet 7, and the springs 2 impart rotation through the gear train to the wheel 17, the governor consisting of the brake wheel 20 and pendulums 22, 22 controlling the speed of rotation of the wheel 17. As the wheel 17 rotates, the stud 18 will contact the rocking arm 23, moving the connecting arm 24, opening the beak through the arm 30 and simultaneously rotating the ratchet wheel 25, operating the squawker. As the wheel 17 rotates, the stud 18 on the wheel 17 contacts the actuating arm 34, raising the wings 33 once per revolution of the wheel 17, thus imparting movement to the wings. As the stud 18 contacts either the arm 23 or the bar 34, the load slows the wheel 17, causing the pendulums 22, 22 to drop and permitting all of the energy of the springs 2, 2 to be directed against the load.

It is understood of course that a gear wheel could well be added to turn a propeller shaft to make the decoy swim.

While the foregoing is considered a preferred form of the invention, it is by way of illustration only, the broad principle of the invention to be defined by the appended claim.

What I claim is:

In a decoy, a hollow body shaped to simulate a swimming fowl, movable wings mounted on said body, a main spring mounted in said body adapted to furnish power, a train of gears adapted to be rotated by said main spring, an axle within said body having a speed governor mounted thereon to control the speed of rotation of said gears, a disc element having an outwardly projected stud mounted on and adapted to be rotated by said axle, lifting means mounted in said body and connected to the wings of the body, said stud on said disc being adapted to contact said lifting means and lift the same upon each rotation of the disc, a rocking arm mounted in said body and adapted to be contacted by said stud adjacent one end, an upwardly extended arm having one end connected to the opposite end of said rocking arm, a movable lower beak on said body, the opposite end of said upwardly extending arm being connected with said beak and a noise maker mounted in the head portion of said body having an activating disc element adapted to be rotated with each upward stroke of said arm.

References Cited in the file of this patent

UNITED STATES PATENTS

| | | |
|---|---|---|
| 1,021,910 | Baker et al. | Apr. 2, 1912 |
| 1,110,245 | Vaughan | Sept. 8, 1914 |
| 1,373,168 | Buchannan | Mar. 29, 1921 |
| 2,013,709 | Boissoneau | Sept. 10, 1935 |
| 2,227,242 | Boutin | Dec. 31, 1940 |
| 2,410,646 | Finn | Nov. 5, 1946 |
| 2,480,390 | Thompson | Aug. 30, 1949 |